United States Patent
Ji (10) Patent No.: US 6,584,085 B1
(45) Date of Patent: Jun. 24, 2003

(54) APPARATUS FOR AND METHOD OF ALLOCATING D-CHANNEL TO MINIMUM CHANNEL WHEN PERFORMING BASIC RATE INTERFACE SERVICE IN WIRELESS LOCAL LOOP NETWORK SYSTEM

(75) Inventor: Chang-Hwan Ji, Pusan-shi (KR)

(73) Assignee: Hyundai Curitel, Inc. (KR)

( * ) Notice: Subject to any disclaimer, the term of this patent is extended or adjusted under 35 U.S.C. 154(b) by 0 days.

(21) Appl. No.: 09/443,979

(22) Filed: Nov. 19, 1999

(30) Foreign Application Priority Data

Nov. 20, 1998 (KR) .............................. 98-49939

(51) Int. Cl.⁷ .............................. H04Q 12/50
(52) U.S. Cl. ...................... 370/329; 485/459
(58) Field of Search ................. 455/422, 452, 455/447, 450, 513, 226.1, 62, 63, 560, 561; 370/351, 352, 353, 354, 355, 356, 321, 322, 326, 327, 328, 329, 337, 338, 340, 341, 347, 348, 522, 524, 264

(56) References Cited

U.S. PATENT DOCUMENTS

| | | | | |
|---|---|---|---|---|
| 5,796,729 A | * | 8/1998 | Greaney et al. | 370/345 |
| 5,845,211 A | * | 12/1998 | Roach, Jr. | 455/436 |
| 5,910,946 A | * | 6/1999 | Csapo | 370/328 |
| 5,940,759 A | * | 8/1999 | Lopez-Torres et al. | 455/433 |
| 5,946,474 A | * | 8/1999 | Skoby | 395/500 |
| 5,987,017 A | * | 11/1999 | Lee | 370/326 |
| 6,075,783 A | * | 6/2000 | Voit | 370/352 |

FOREIGN PATENT DOCUMENTS

WO    WO 99/03225    1/1999

* cited by examiner

Primary Examiner—Lester G. Kincaid
Assistant Examiner—Naghmeh Mehrpour
(74) Attorney, Agent, or Firm—Blakely Sokoloff Taylor & Zafman (57) ABSTRACT

An apparatus for and a method of allocating D-channel to minimum channel when performing a basic rate interface (BRI) in WLL, in which D-channel is allocated to the minimum channel when connection is made to V5.2 of WLL exchanger and BRI, while satisfying WLL standards, and system maintenance and extension can be easily achieved by having a modular mounting board, the apparatus includes a first and a second analog/digital (A/D) signal converting units for converting an analog signal input from a radio frequency unit (RFU) into a digital signal and transmitting the converted signal to RFU, and converting the received digital data to analog data and transmitting the converted signal to RFU; a first and a second modem units for code-dividing data inputted from the first and second A/D signal converting units; a channel handler/HDLC controller for searching D-channel from data outputted from the first and second units and combining D-channel to a single channel of 64 Kbps; a CPU for framing data received from the channel handler/HDLC controller for use of IPC communication and performing control over a block; a memory for temporarily storing variables or data, being connected to the CPU; an IPC interface unit connected between the CPU and a main processor so as to perform IPC communications; and a mux/demux unit for multiplexing data of 64 Kbps outputted from the first and second modem units to data of 2,048 bps.

7 Claims, 6 Drawing Sheets

APPARATUS FOR AND METHOD OF ALLOCATING D-CHANNEL TO MINIMUM CHANNEL WHEN PERFORMING BASIC RATE INTERFACE SERVICE IN WIRELESS LOCAL LOOP NETWORK SYSTEM

BACKGROUND OF THE INVENTION

1. Field of the Invention

The present invention relates to a wireless local loop system (WLL), and more particularly, to an apparatus for and a method of allocating D-channel to minimum channel when performing a basic rate interface (BRI) in WLL, in which D-channel is allocated to the minimum channel when connection is made to V5.2 of WLL exchanger and BRI, while satisfying WLL standards, and system maintenance and extension can be easily achieved by having a modular mounting board.

2. Description of the Related Art

In general, BRI information data service is performed by WLL system, and 2B+D data has to be transmitted through B-channel, a voice band data channel, for such a service.

Specifically, total voice data processing volume from among WLL system decreases when BRI service increases, since D-channel only has 2-bit data. This is because 2-bit D-channel has to be allocated per 8-bit B-channel.

Two types of methods have been developed to process ISDN data served by WLL system and transmit the same to an exchanger; a first method is for the case where a link protocol between a radio port controller (RPC) and an exchanger is E1/V5.2, and a second method is for the case where 2W digital line connects between RPC and exchanger.

In such a conventional art, 2B+D data has to be transmitted through B-channel for processing BRI information data. However, a problem may arises in that an overall voice data processing volume decreases in WLL system when BRI service increases, since D-channel only has 2-bit data.

SUMMARY OF THE INVENTION

Therefore, it is an object of the present invention to provide an apparatus for and a method of allocating D-channel to minimum channel when performing a basic rate interface (BRI) in WLL, in which D-channel is allocated to the minimum channel when connection is made to V5.2 of WLL exchanger and BRI, while satisfying WLL standards, and system maintenance and extension can be easily achieved by having a modular mounting board.

To accomplish such an object of the present invention, there is provided an apparatus for allocating D-channel to minimum channel when BRI service is performed in WLL system, in a digital unit for combining and distributing D-channel in a radio port of WLL system, the apparatus including: a first and a second analog/digital (A/D) signal converting units for converting an analog signal input from a radio frequency unit (RFU) into a digital signal and transmitting the converted signal to RFU, and converting the received digital data to analog data and transmitting the converted signal to RFU; a first and a second modem units for code-dividing data inputted from the first and second A/D signal converting units; a channel handler/HDLC controller for searching D-channel from the data outputted from the first and second units and combining the D-channel to a single channel of 64 Kbps; a CPU for framing data received from the channel handler/HDLC controller for use of IPC communication and performing control over a block; a memory for temporarily storing variables or data, being connected to the CPU; an IPC interface unit connected between the CPU and a main processor so as to perform IPC communications; and a mux/demux for multiplexing data of 64 Kbps outputted from the first and second modem units to data of 2,048 bps.

To accomplish an object of the present invention, there is provided an apparatus for allocating D-channel to minimum channel when BRI service is performed in WLL system, in BRI interface unit for combining and distributing D-channel in a radio port controller (RPC) of WLL system, the apparatus including: a channel handler/HDLC controller for extracting D-channel from 2B+D data output from a 2W interface, performing a cycle redundancy check (CRC) on the extracted D-channel, and combining D-channel of 2-bits to a single channel of 64 Kbps; a CPU for framing data received from the channel handler/HDLC controller to allow an IPC communication and performing a control all over a block; a memory connected to the CPU and which stores temporarily variables or data; an IPC interface connected between the CPU and a main processor so as to allow an IPC communication; and mux/demux connected to the main processor and which converts 2-bit data of 64 Kbps input from the 2W interface to data of 2,048 bps.

To accomplish an object of the present invention, there is provided a method of allocating D-channel to a minimum channel when BRI service is performed in WLL system, in a process of handling D-channel of digital unit included in a radio port (RP) of WLL system, the method including the steps of: in a bottom-up handling from a terminal to an exchanger, allowing D-channel data to be available for an IPC by a CPU of the digital unit and transmitted to a main processor; transmitting to a radio port controller (RPC) D-channel which is inserted to channel No. 16 of RPC E1 interface via an IPC interface, together with D-channel data which is inserted in channel No. 16 and LAPD (Link Access Procedure on D-channel) processing data; and, when D-channel is inserted into B-channel due to a heavier loading of channel No. 16, performing LAPD process on the D-channel data together with the data inserted into B-channel, and transmitting the LAPD processed data to the RPC.

To accomplish an object of the present invention, there is provided a method of allocating D-channel to a minimum channel when BRI service is performed in WLL system, in a process of handling D-channel of a digital unit included in a radio port (RP) of WLL system, the method including the steps of: in a top-down handling from an exchanger to a terminal, analyzing D-channel data as to whether D-channel exists in channel No. 16 and transmitting D-channel data to the digital unit through an IPC interface if D-channel data is in channel No. 16; and if D-channel data does not exist in B-channel, extracting B-channel containing D-channel using a time switch by informing the main process of such a fact and transmitting the extracted B-channel to the digital unit via the IPC interface.

To accomplish an object of the present invention, there is provided a method of allocating D-channel to a minimum channel when BRI service is performed in WLL system, in a process of handling D-channel of BRI interface included in a radio port controller (RPC) of wireless local loop system, the method including the steps of: in a bottom-up handling from RPC to an exchanger, performing an IPC-process on D-channel data by CPU of BRI interface and transmitting the IPC-processed D-channel data to a main processor; transmitting 30-bit data received from the main processor to a mux/demux; extracting channel No. 16 from D-channel data input from a radio port, performing high-level data link (HDLC) protocol on the extracted channel No. 16, transmitting the result to CPU, and performing an IPC processing; in the absence of D-channel, transmitting by an IPC interface to the main processor an information of absence of D-channel and extracting and processing by the main processor a traffic channel having D-channel; in the presence of D-channel, transmitting IPC-processed D-channel and D-channel data to the main processor, transmitting by the main processor D-channel and D-channel data to a BRI interface IPC processor so as to analyze D-channel, and transmitting the result to a high-level data link controller; and dividing into 2-bit D-channel for each output port by the high-level data link controller, inserting for each channel, and transmitting 2B+D (2bit+D-channel) data to an exchanger.

To accomplish an object of the present invention, there is provided a method of allocating D-channel to a minimum channel when BRI service is performed in WLL system, in a process of handling D-channel of BRI interface included in a radio port controller (RPC) of wireless local loop system, the method including the steps of: in a top-down handling from RPC to an exchanger, analyzing D-channel data as to whether D-channel exists in channel No. 16, and transmitting D-channel data to BRI interface via 2W interface, if D-channel data exists in channel No. 16; and informing a main processor of the absence of D-channel data, if D-channel data does not exist in channel No. 16, extracting B-channel contained in D-channel using a time switch, and transmitting the extracted B-channel data to the BRI interface.

BRIEF DESCRIPTION OF THE DRAWINGS

The present invention will become more fully understood from the detailed description given hereinafter accompanying drawings, which are given by way of illustration only, and thus are not limitative of the present invention, and wherein.

PREFERRED EMBODIMENTS OF THE PRESENT INVENTION

The present invention will be explained in more detail with reference to the attached drawings.

Figure 1:
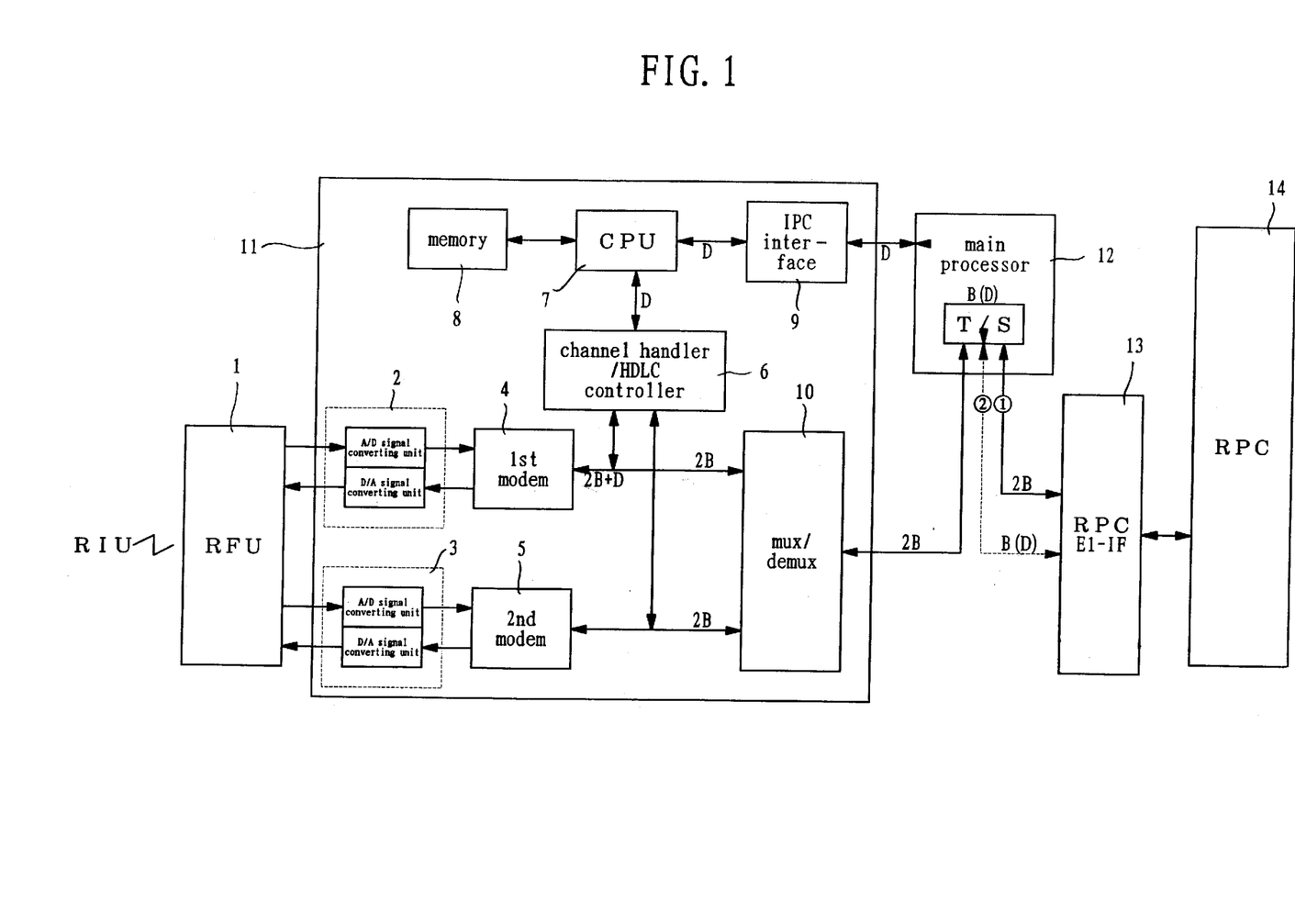
FIG. 1 is a block diagram showing a digital unit for combining and distributing D-channel in a radio port according to the present invention.

FIG. 1 is a detail block diagram of a digital unit 11 of the present invention. Digital unit 11 is made up of signal converting portions 2 and 3 consisting of an analog-digital converter which converts an analog signal input from a radio frequency unit (RFU) 1 to a digital signal and transmits the converted digital signal to a modem, and a digital-analog converter which converts a digital data received from the modem to an analog data and transmits the converted analog data to RFU 1; a first modem 4 and a second modem 5 which code-division converts data input from signal converting portions 2 and 3; a channel handler/HDLC controller 6 which searches D-channel from the data output via first and second modems 4 and 5 and gathers four D-channels to make a single channel of 64 Kbps; a CPU 7 which frames data received from channel handler/HDLC controller 6 to be available for IPC communication and performs an overall control on a block; a memory 8 which is connected to CPU 7 and temporarily stores variables or data; an IPC interface 9 which is connected between CPU 7 and main processor 12 and which processes data to be available for IPC communication; and a mux/demux 10 for converting data of 64 Kbps output via first and second modems 4 and 5 to data of 2,048 bps.

Reference numeral 12 denotes a main processor embedded with a time switch, reference numeral 13 denotes an RPC-E1-1F, and reference numeral 14 denotes a radio port controller (RPC). Referring to FIG. 1, radio port (RP) portion is those excluding radio interface unit (RIU) and radio port controller (RPC) 14.

Figure 2:
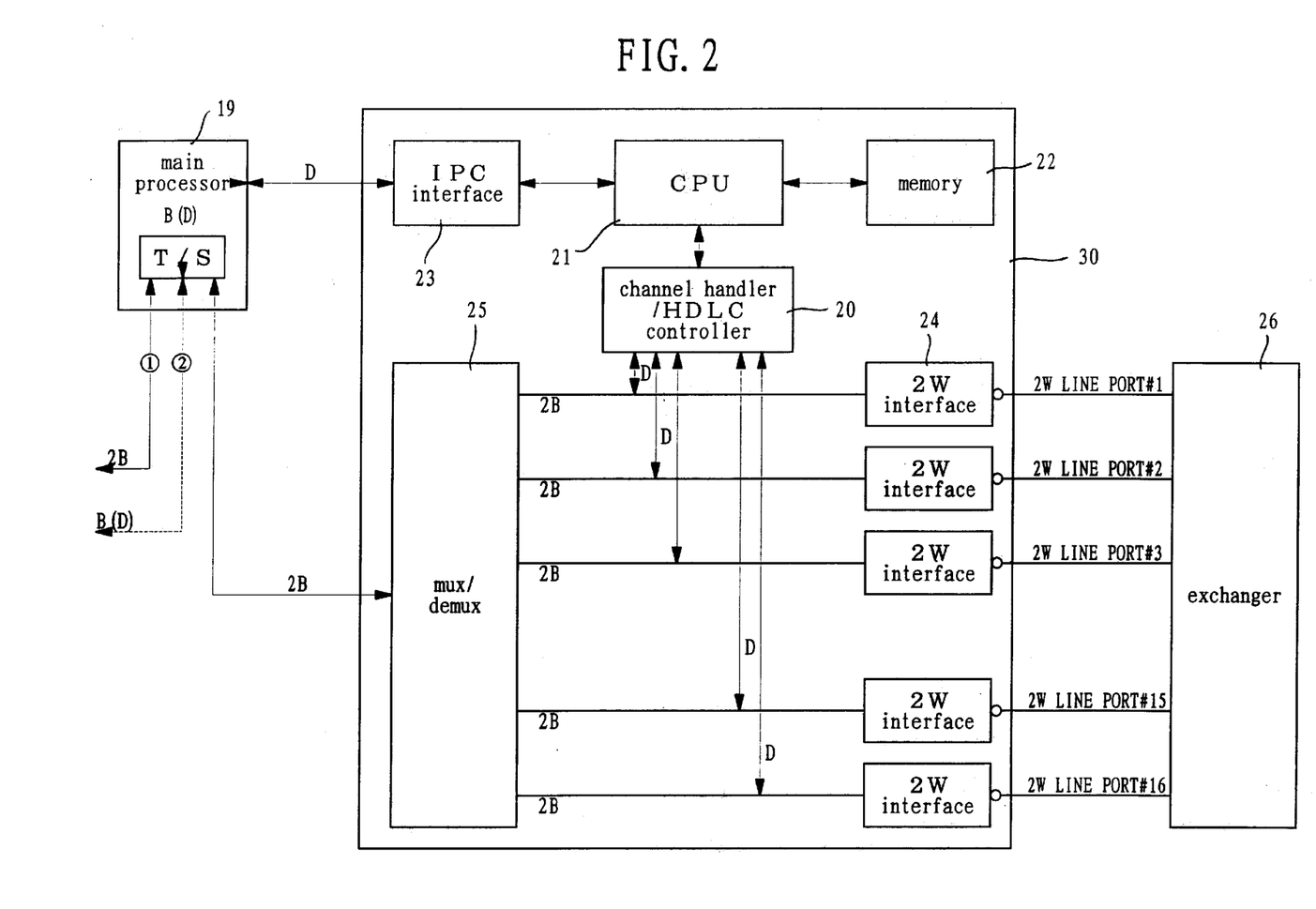
FIG. 2 is a block diagram showing a BRI interface board according to the present invention.

FIG. 2 is a block diagram of a BRI interface 30 which is made up of a channel handler/HDLC controller 20 which extracts D-channel from 2B+D data output from a 2W interface, performs a CRC check on the extracted data, combines actual data of 2-bits, and makes a single channel of 64 Kbps, a CPU 21 which frames data received from channel handler/HDLC controller 20 to be available for IPC communication and performs an overall control on a block; a memory 22 which is connected to CPU 21 and temporarily stores variables or data; an IPC interface 23 which is connected between CPU 21 and a main processor 19 and which processes data to be available for IPC communication; and a mux/demux 25 which is connected to main processor 19 and converts 2-bit data of 64 Kbps input from 2W interface 24 to data of 2,048 bps.

Reference numeral 19 denotes a main processor embedded with a time switch, reference numeral 26 denotes an exchanger (embedded with a BRI interface) which is connected to 2W interface 24 through 2W line ports #1 to 16.

The present invention having the above-described structure operates as follows.

Figure 3:
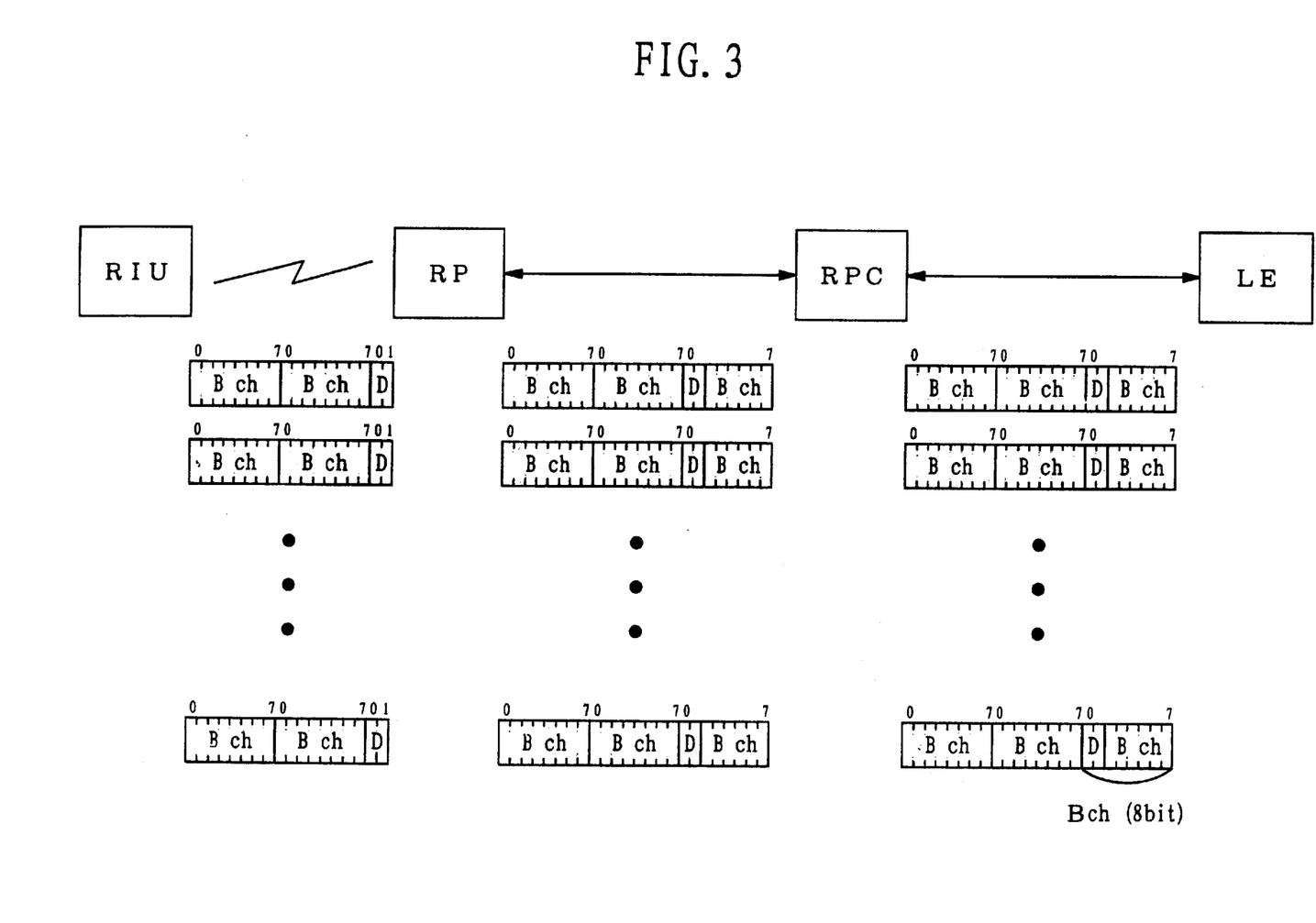
FIG. 3 illustrates a case where D-channel is transmitted being loaded in a single B-channel according to the present invention.
Figure 4:
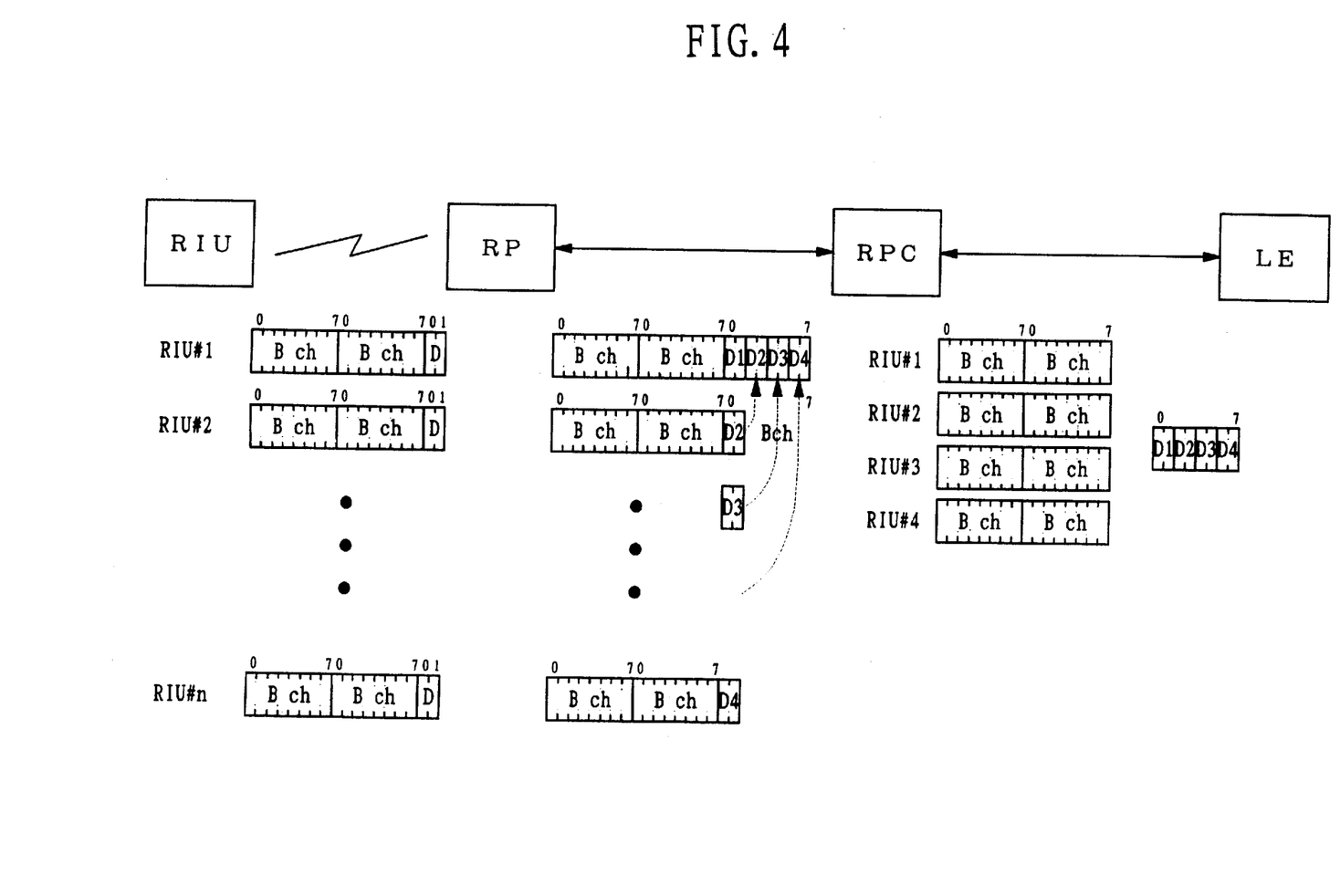
FIG. 4 illustrates a case where four D-channels are transmitted being loaded in a single B-channel according to the present invention.

FIG. 3 illustrates a concept of a method of handling D-channel when performing ISDN service in WLL system. In the method illustrated in FIG. 3, D-channel is transmitted being loaded onto B-channel for use in a voice transmission. FIG. 4 illustrates a concept of a method of allocating D-channel in optimum mode, wherein D-channel in 2B+D is 2-bits.

These 2-bits are extracted by the HDLC handler and cycle-redundancy checked, to thereby extract actual D-channel data of 2-bits. Then, a single channel of 8-bits is obtained by combining four D-channels of 2-bits, transmitted to RPC 14, and divided into those to be sent to subscribers.

FIG. 1 is a block diagram of digital unit 11 which extracts those D-channels from RP, allocates four D-channels to a single channel as shown in FIG. 3, and transmits/receives the allocated channels. When a signal is radio-input to RFU 1 from RIU, an analog signal from RFU 1 is converted into a digital signal through signal converting portions 2 and 3. The data which is bottom-up handled from RIU is code-division converted by first and second modems 4 and 5, and 2-bit data from which is transmitted to mux/demux 10. Then, four D-channels are extracted by channel handler/HDLC controller 6, and produced as a single time slot which then is transmitted to RPC 14 via CPU 7, IPC interface 9, and main processor 12.

Therefore, RPC 14 switch-controls 2B+D data through the time switch of main processor 19.

As shown in FIG. 2, in BRI interface 30 of RPC 14, when a matching method with respect to WLL exchanger 26 employs 2W digital line in providing ISDN service, each 2W line port of 2W interface 24 which is interfaced to WLL exchanger 26 through BRI interface 30 is allocated and connected to ISDN subscriber's number of RIU. Thus, a path therebetween is always opened so that a recognition on the data input to each port is transmitted, which allows an easy recognition as to which data input to each port is transmitted to which subscriber.

That is, to keep the RP-exchangeable period D-channel bypass which is defined by WLL standards, RIU #1 is matched to 2W line port #1 of BRI interface PBA #1, and RIU #2 is matched to 2W line port #s of BRI interface PBA #1.

BRI interface board 30 is structured in that each RIU number corresponds to each output port number. Therefore, there is no use of reading D-channel, because it can be easily understood that from where the D-channel data is received and to where the D-channel data is transmitted.

Referring to FIG. 2, signal flow ① is for the case where the combined D-channel data is transmitted/received being loaded onto PIC channel, and signal flow ② is for the case where the combined D-channel data is transmitted being loaded onto a traffic channel, i.e., voice data channel, and transmitted again to IPC interface 23 by a time switch of main processor 19, and transmitted to WLL exchanger 26 by being interfaced via 2W interface 24 by HDLC controller 20.

Here, 2W interface 24 interconnects BRI and RPC 14 by 2-way, and is not provided with a current feeding function therebetween.

The case where D-channel is transmitted being loaded onto a traffic channel is those where D-channel may not be smoothly transmitted being loaded onto #1 to #16 channels of 2W line port due to increased ISDN service subscribers. This case is those where D-channel is transmitted being loaded onto the traffic channel rather than onto the IPC channel.

Figure 5:
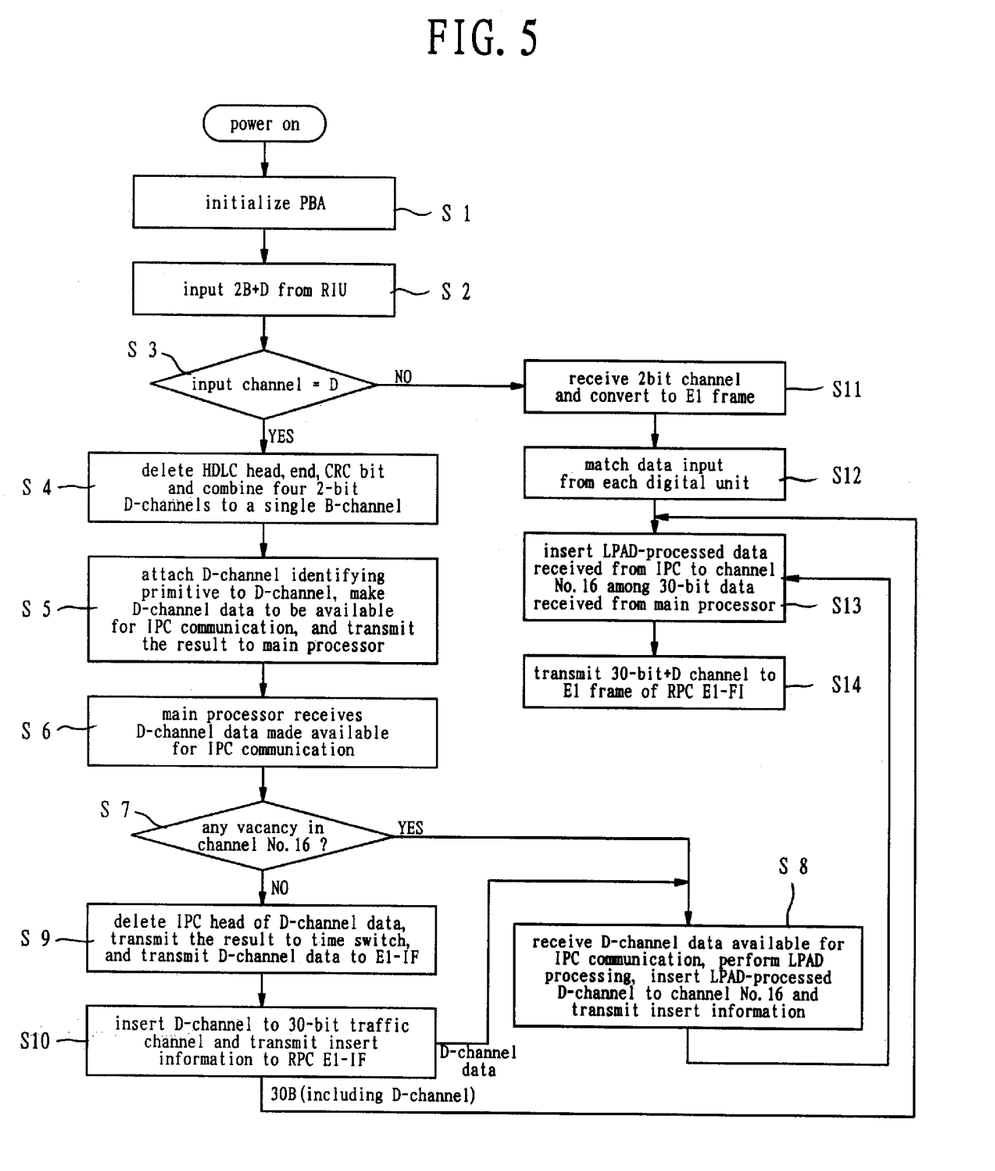
FIG. 5 is a flowchart for a procedure of handling D-channel of a digital unit according to the present invention.

FIG. 5 illustrates a method of handling D-channel of digital unit 11, wherein the PBA of digital unit 11 is initialized and 2B+D is input from RIU to first and second modems 4 and 5 when the power is turned on (step S2).

Subsequently, it is determined whether the input channel is D-channel (step S3), and if it is determined as D-channel, HDLC head, end, and CRC bit is deleted by HDLC controller 6, and four 2-bit D-channels are combined into a single B-channel (step S4).

D-channel identifying primitive to D-channel, make D-channel data to be available for IPC communication, and transmit the result to main processor 12 (step S5).

Then, main processor 12 receives D-channel data which is made available for IPC communication, and determines whether there is any vacancy in channel No. 16. (steps S6 and S7)

If there is any vacancy in channel No. 16, RPC E1-1F 13 receives D-channel data made available for IPC communication, performs LPAC processing on such D-channel data, inserts the LPAD-processed D-channel to channel No. 16, and transmits the insert information to channel No. 16 (step S8).

If it is determined that there is no vacancy in channel No. 16 in step S7, main processor 12 deletes IPC head of D-channel data, transmits the result to a time switch, and transmits D-channel data to RPC E1-1F 13 (step S9).

The time switch of main processor 12 inserts D-channel to 30-bit traffic channel, and transmits the insert information to RPC E1-1F 13 (step S10).

In the meantime, if it is determined that the input channel is not D-channel, mux/demux 10 receives 2-bit channel and converts the received channel to E1 frame (step S11), and the time switch of main processor 12 matches data input from each digital unit (step S12).

The time switch included in RPC E1-1F 13 inserts the data which is LPAD-processed in IPC interface 9 to channel No. 16 among 30-bit data received from main processor 12, and transmits 30B+D channel to E1 frame of RPC E1-1F 13 (steps S13 and S14).

In summary, D-channel handling procedure of digital unit 11 is that D-channel data is made available for IPC communication by CPU 7 of digital unit 11, in a bottom-up handling, and transmitted to main processor 12, and when D-channel is inserted to channel No. 16 by RPC E1-1F 13 via IPC interface 9, the inserted D-channel is transmitted to RPC 14 together with D-channel data and LPAD processing data. When D-channel is inserted into B-channel by main processor 12 (that is, when channel No. 16 is heavily loaded), D-channel data is LAPD-processed including the data inserted in B-channel, and D-channel data (i.e., combination of four 2-bit D-channel data of RIU), and transmitted to RPC 14.

In the top-down handling, D-channel data which is LAPD-processed is analyzed, and the D-channel data is transmitted to digital unit 11 via IPC interface 9, if D-channel data is in channel No. 16, and the absence of D-channel data in B-channel is informed to main processor 12, if D-channel data is not in B-channel, and the time switch extracts B-channel containing D-channel, and the extracted B-channel is transmitted to digital unit 11 via IPC interface 9.

Figure 6:
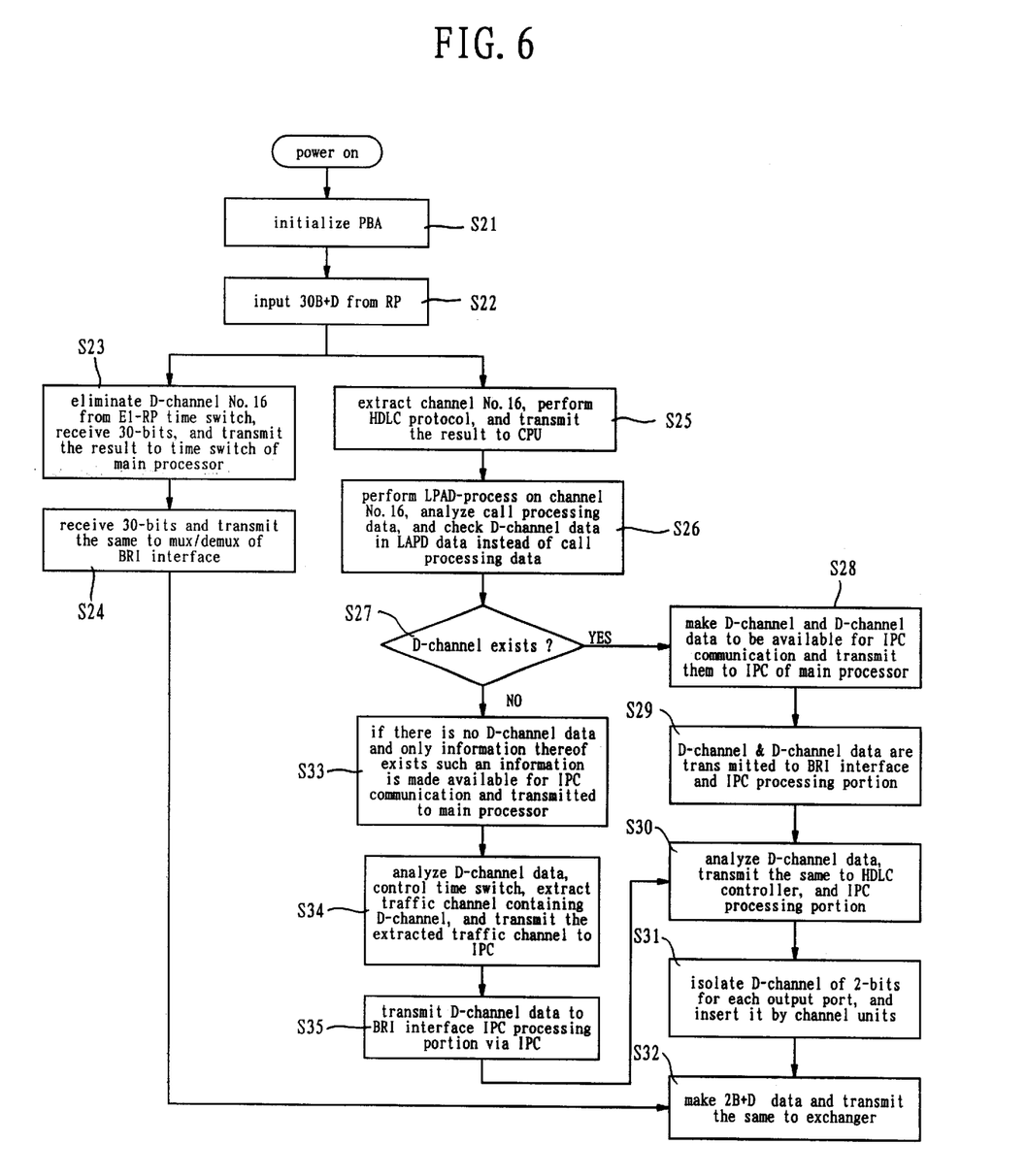
FIG. 6 is a flowchart for a procedure of handling D-channel of a BRI interface board according to the present invention.

FIG. 6 illustrates a method of handling D-channel of BRI interface 30, wherein the PBA of BRI interface 30 is initialized (step S21), and 30B+D is input from RP of E1-RP E1 frame (step S22).

Then, D-channel No. 16 is eliminated from E1-RP time switch, and 30-bits are received and transmitted to the time switch of main processor 19.

Subsequently, the time switch of main processor 12 receives 30-bits and transmits the same to mux/demux 25 of BRI interface 30 (step S24).

Meanwhile, channel handler/HDLC controller 20 extracts channel No. 16, performs HDLC protocol, and transmits the result to CPU 21 (step S25).

IPC interface 23 performs LPAD-process on channel No. 16, analyzes call processing data, and checks D-channel data in LAPD data instead of call processing data (step S26).

Then, it is determined whether D-channel exists (step S27), and if D-channel exists, IPC interface 23 makes D-channel and D-channel data to be available for IPC communication and transmits them to IPC of main processor 19 (step S28).

Subsequently, IPC of main processor 19 transmits D-channel and D-channel data to BRI interface and IPC processing portion (step S29) Here, BRI interface and IPC processing portion refer to channel handler/HDLC controller 20, CPU 21, memory 22, and IPC interface 23.

Next, BRI interface and IPC processing portion analyze D-channel data, transmit the same to HDLC controller 20, and control the same (step S30).

HDLC controller 20 isolates D-channel of 2-bits for each output port, and inserts it by channel units (step S31).

BRI interface makes 2B+D data and transmits the same to exchanger 26 (step S32).

In aforementioned step S27, if it is determined that D-channel does not exist, say, if IPC interface 23 does not have D-channel data and only has an information thereof, such an information is made available for IPC communication and transmitted to main processor 19 (step S33).

IPC processing portion of main processor 19 analyzes D-channel data, controls a time switch, extracts a traffic channel containing D-channel, and transmits the extracted channel to IPC interface 23 (step S34).

IPC processing portion of main processor 19 transmits D-channel data to BRI interface IPC processing portion via IPC interface 23 (step S35). Then, the procedure returns to step S30.

As described above, the present invention has benefits in that D-channel is allocated to the minimum channel when connection is made to V5.2 of WLL exchanger and BRI, while satisfying WLL standards, and a digital unit and 2W BRI interface unit are provided, and system maintenance and extension can be easily achieved by having a modular mounting board.

What is claimed is:

1. An apparatus for allocating D-channel to minimum channel when BRI service is performed in WLL system, in a digital unit for combining and distributing D-channel in a radio port of WLL system, said apparatus comprising:

a first and a second analog/digital (A/D) signal converting units for converting an analog signal input from a radio frequency unit (RFU) into a digital signal and transmitting said converted signal to RFU, and converting said received digital data to analog data and transmitting said converted signal to RFU;

a first and a second modem units for code-dividing data inputted from said first and second A/D signal converting units;

a channel handler/HDLC controller for searching D-channel from data outputted from said first and second units and combining D-channel to a single channel of 64 Kbps;

a CPU for framing data received from said channel handler/HDLC controller for use of IPC communication and performing control over a block;

a memory for temporarily storing variables or data, being connected to said CPU;

an IPC interface unit connected between said CPU and a main processor so as to perform IPC communications; and a mux/demux unit for multiplexing data of 64 Kbps outputted from said first and second modem units to data of 2,048 bps.

2. An apparatus for allocating D-channel to minimum channel when BRI service is performed in WLL system according to claim 1, wherein said channel handler/HDLC controller combines four 2-bit D-channels into a single B-channel.

3. An apparatus for allocating D-channel to minimum channel when BRI service is performed in WLL system, in BRI interface unit for combining and distributing D-channel in a radio port controller (RPC) of WLL system, said apparatus comprising:

a channel handler/HDLC controller for extracting D-channel from 2B+D (2 bit+D-channel) data output from a 2W interface, performing a cycle redundancy check (CRC) on the extracted D-channel, and combining D-channel of 2-bits to a single channel of 64 Kbps;

a CPU for framing data received from said channel handler/HDLC controller to allow an IPC communication and performing a control all over a block;

a memory connected to said CPU and which stores temporarily variables or data;

an IPC interface connected between said CPU and a main processor so as to allow an IPC communication; and a mux/demux unit connected to said main processor and which converts 2-bit data of 64 Kbps input from said 2W interface to data of 2,048 bps.

4. A method of allocating D-channel to a minimum channel when BRI service is performed in WLL system, in a process of handling D-channel of digital unit included in a radio port (RP) of WLL system, said method comprising the steps of:

in a bottom-up handling from a terminal to an exchanger, allowing D-channel data to be available for an IPC by CPU of said digital unit and transmitted to a main processor;

transmitting to a radio port controller (RPC) D-channel which is inserted to channel No. 16 of RPC E1 interface via an IPC interface, together with D-channel data which is inserted in channel No. 16 and LAPD (Link Access Procedure on D-channel) processing data; and, when D-channel is inserted into B-channel due to a heavy load of channel No. 16, performing LAPD process on said D-channel data together with the data inserted into B-channel, and transmitting the LAPD processed data to said RPC.

5. A method of allocating D-channel to a minimum channel when BRI service is performed in WLL system, in a process of handling D-channel of a digital unit included in a radio port (RP) of WLL system, said method comprising the steps of:

in a top-down handling from an exchanger to a terminal, analyzing D-channel data as to whether D-channel exists in channel No. 16 and transmitting D-channel data to said digital unit through an IPC interface if D-channel data is in channel No. 16; and if D-channel data does not exist in B-channel, extracting B-channel containing D-channel using a time switch by informing a main process of non-existence of D-channel data and transmitting the extracted B-channel to said digital unit via said IPC interface.

6. A method of allocating D-channel to a minimum channel when BRI service is performed in WLL system, in a process of handling D-channel of BRI interface included in a radio port controller (RPC) of wireless local loop system, said method comprising the steps of:

in a bottom-up handling from RPC to an exchanger, performing an IPC-process on D-channel data by CPU of BRI interface and transmitting the IPC-processed D-channel data to a main processor;

transmitting 30-bit data received from said main processor to a mux/demux;

extracting channel No. 16 from D-channel data input from a radio port, performing high-level data link (HDLC)

protocol on the extracted channel No. 16, transmitting the result to CPU, and performing an IPC processing;

in the absence of D-channel, transmitting by an IPC interface to said main processor an information of absence of D-channel and extracting and processing by said main processor a traffic channel having D-channel;

in the presence of D-channel, transmitting IPC-processed D-channel and D-channel data to said main processor, transmitting by said main processor D-channel and D-channel data to a BRI interface IPC processor so as to analyze D-channel, and transmitting the result to a high-level data link controller; and dividing into 2-bit D-channel for each output port by said high-level data link controller, inserting for each channel, and transmitting 2B+D (2 bit+D-channel) data to an exchanger.

7. A method of allocating D-channel to a minimum channel when BRI service is performed in WLL system, in a process of handling D-channel of BRI interface included in a radio port controller (RPC) of wireless local loop system, said method comprising the steps of:

in a top-down handling from RPC to an exchanger, analyzing D-channel data as to whether D-channel exists in channel No. 16, and transmitting D-channel data to BRI interface via 2W interface, if D-channel data exists in channel No. 16; and informing a main processor of the absence of D-channel data, if D-channel data does not exist in channel No. 16, extracting B-channel contained in D-channel using a time switch, and transmitting the extracted B-channel data to said BRI interface.

\* \* \* \* \*